United States Patent
Ogawa et al.

(10) Patent No.: US 9,318,756 B2
(45) Date of Patent: Apr. 19, 2016

(54) FUEL CELL MODULE

(75) Inventors: Tetsuya Ogawa, Wako (JP); Keiji Tsukamoto, Wako (JP); Go Muto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 264 days.

(21) Appl. No.: 14/111,002

(22) PCT Filed: Feb. 9, 2012

(86) PCT No.: PCT/JP2012/053592
§ 371 (c)(1),
(2), (4) Date: Oct. 10, 2013

(87) PCT Pub. No.: WO2012/140952
PCT Pub. Date: Oct. 18, 2012

(65) Prior Publication Data
US 2014/0030620 A1    Jan. 30, 2014

(30) Foreign Application Priority Data
Apr. 14, 2011    (JP) .................................. 2011-090341

(51) Int. Cl.
*H01M 8/10* (2006.01)
*H01M 8/04* (2006.01)
(Continued)

(52) U.S. Cl.
CPC ........... *H01M 8/04074* (2013.01); *C01B 3/384* (2013.01); *H01M 8/04022* (2013.01); *H01M 8/04067* (2013.01); *H01M 8/0494* (2013.01); *H01M 8/04268* (2013.01); *H01M 8/04365* (2013.01); *H01M 8/04373* (2013.01);
(Continued)

(58) Field of Classification Search
CPC .............. H01M 8/04; H01M 8/04059; H01M 8/04067; H01M 8/04022
See application file for complete search history.

(56) References Cited

U.S. PATENT DOCUMENTS

2005/0249991 A1* 11/2005 Pastula et al. .................... 429/20
2009/0263689 A1* 10/2009 Homma .......................... 429/19

FOREIGN PATENT DOCUMENTS

| JP | 2004-192958 | 7/2004 |
|----|-------------|--------|
| JP | 2005-166439 | 6/2005 |

(Continued)

OTHER PUBLICATIONS

This application is co-pending with U.S. Appl. No. 14/111,001, filed Oct. 10, 2013.
Japanese Office Action for Application No. 2011-090341 dated Jul. 15, 2014; partial English translation included.
(Continued)

*Primary Examiner* — Stewart Fraser
*Assistant Examiner* — Olatunji Godo
(74) *Attorney, Agent, or Firm* — Rankin, Hill & Clark LLP

(57) ABSTRACT

A fuel cell module includes a fuel cell stack formed by stacking a plurality of fuel cells for generating electricity by electrochemical reactions of a fuel gas and an oxygen-containing gas, a reformer for reforming a mixed gas of a raw fuel and water vapor, an evaporator for supplying water vapor to the reformer, a heat exchanger for raising the temperature of the oxygen-containing gas by heat exchange with a combustion gas, an exhaust gas combustor for producing the combustion gas, and a start-up combustor for producing the combustion gas. The exhaust gas combustor is provided integrally in the heat exchanger. The start-up combustor is provided adjacent to one end of the heat exchanger.

4 Claims, 9 Drawing Sheets

(51) Int. Cl.
*C01B 3/38* (2006.01)
*H01M 8/06* (2006.01)

(52) U.S. Cl.
CPC ...... *H01M8/04619* (2013.01); *H01M 8/04753* (2013.01); *H01M 8/0612* (2013.01); *C01B 2203/0233* (2013.01); *C01B 2203/066* (2013.01); *C01B 2203/067* (2013.01); *C01B 2203/0833* (2013.01); *C01B 2203/1247* (2013.01); *C01B 2203/1258* (2013.01); *C01B 2203/1288* (2013.01); *H01M 2008/1095* (2013.01); *Y02E 60/50* (2013.01)

(56) References Cited

FOREIGN PATENT DOCUMENTS

| | | |
|---|---|---|
| JP | 2005-174649 | 6/2005 |
| JP | 2006-156096 | 6/2006 |
| JP | 2009-277621 | 11/2009 |
| WO | 2005/069776 | 8/2005 |

OTHER PUBLICATIONS

Japanese Office Action for Application No. 2011-090343 dated Jul. 22, 2014; partial English translation included.

* cited by examiner

FUEL CELL MODULE

TECHNICAL FIELD

The present invention relates to a fuel cell module including a fuel cell stack formed by stacking a plurality of fuel cells for generating electricity by electrochemical reactions of a fuel gas and an oxygen-containing gas.

BACKGROUND ART

Typically, a solid oxide fuel cell (SOFC) employs a solid electrolyte of ion-conductive solid oxide such as stabilized zirconia. The electrolyte is interposed between an anode and a cathode to form an electrolyte electrode assembly (hereinafter also referred to as MEA). The electrolyte electrode assembly is interposed between separators (bipolar plates). In use, generally, predetermined numbers of the electrolyte electrode assemblies and the separators are stacked together to form a fuel cell stack.

As a system including such a fuel cell stack, for example, a fuel cell system disclosed in Japanese Laid-Open Patent Publication No. 2005-166439 (hereinafter referred to as Conventional Technique 1) is known. As shown in FIG. 9, the fuel cell system uses a solid electrolyte fuel cell 4 having a solid electrolyte 1, a fuel electrode 2 on one side of the solid electrolyte 1, and an air electrode 3 on the other side of the solid electrolyte 1. Air is supplied to the air electrode 3 as an oxygen-containing gas, and fuel gas is supplied to the fuel electrode 2 for generating electricity by reaction of the fuel gas and the air.

In the fuel cell system, additionally, a start-up combustor 5, an exhaust gas combustor 6, and a heat exchanger 7 are provided. At the time of starting operation of the fuel cell system, the start-up combustor 5 reforms or imperfectly combusts the fuel gas supplied from the outside to supply the fuel gas to the fuel electrode 2 as a reducing gas. The exhaust gas combustor 6 combusts off-gas discharged from the fuel electrode 2. The heat exchanger 7 heats the air by the heat generated in the exhaust gas combustor 6.

According to the disclosure, in the structure, a large amount of unreacted exhaust gas, such as carbon monoxide, produced in the fuel cell system at the time of starting operation of the fuel cell system can be reduced as much as possible, generation of heat stress due to the temperature difference can be prevented by heating both of the fuel electrode 2 and the air electrode 3, and improvement in the durability of the fuel cell system is achieved. Further, both of the fuel electrode 2 and the air electrode 3 can be heated at the same time efficiently, and the time required for starting operation of the fuel cell system is reduced.

SUMMARY OF INVENTION

In Conventional Technique 1, two combustors, i.e., the start-up combustor 5 and the exhaust gas combustor 6, are provided separately. In the structure, since heat is radiated from both of the start-up combustor 5 and the exhaust gas combustor 6, losses of heat energy become significantly large. Further, combustion circuits (such as pipes) are complicated, a large number of components are required, and the overall size and cost of the facility are high.

In this regard, there could be an option of providing one combustor having both functions of the start-up combustor 5 and the exhaust gas combustor 6. In this case, the hot off gas discharged from the fuel electrode 2 flows into the exhaust gas combustor 6, and, the temperature of the off gas from the fuel electrode 2 reaches the self-ignition temperature.

Therefore, if the start-up combustor 5 doubles as the exhaust gas combustor 6, at the time of premixed combustion by mixing the off gas discharged from the fuel electrode 2 and the air beforehand, since the temperature of the supplied off gas exceeds the self-ignition temperature, combustion occurs in a pre-mixing chamber. Therefore, one combustor cannot be used for two functions of the start-up combustor 5 and the exhaust gas combustor 6.

The present invention has been made to solve the problems of this type, and an object of the present invention is to provide a fuel cell module in which losses of heat energy from a combustor is suppressed, thermally self-sustaining operation is facilitated, and reduction in the size and the cost of the fuel cell module is achieved.

The present invention relates to a fuel cell module including a fuel cell stack formed by stacking a plurality of fuel cells for generating electricity by electrochemical reactions of a fuel gas and an oxygen-containing gas, a reformer for reforming a mixed gas of a raw fuel chiefly containing hydrocarbon and water vapor to produce the fuel gas supplied to the fuel cell stack, an evaporator for evaporating water, and supplying water vapor to the reformer, a heat exchanger for raising the temperature of the oxygen-containing gas by heat exchange with a combustion gas, and supplying the oxygen-containing gas to the fuel cell stack, an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas, and a start-up combustor for combusting the raw fuel and the oxygen-containing containing gas to produce the combustion gas.

In the fuel cell module, the exhaust gas combustor is provided integrally in the heat exchanger. The start-up combustor is provided adjacent to one end of the heat exchanger.

In the present invention, the exhaust gas combustor is provided integrally in the heat exchanger, and the start-up combustor is provided adjacent to one end of the heat exchanger. Therefore, the heat exchanger, the exhaust gas combustor, and the start-up combustor are substantially combined together. In the structure, heat radiation from the fuel cell module is minimized, and losses of heat energy can be suppressed suitably.

In particular, even in the fuel cell having a large A/F (air/fuel gas), it is possible to raise the temperature of the supplied oxygen-containing gas (air) effectively. Therefore, thermally self-sustaining operation can be performed reliably.

Further, since no pipes are required for connection of the heat exchanger, the exhaust gas combustor, and the start-up combustor, the combustion circuits (e.g., pipes) are simplified and the number of components is reduced. Thus, reduction in the size and the cost is achieved.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
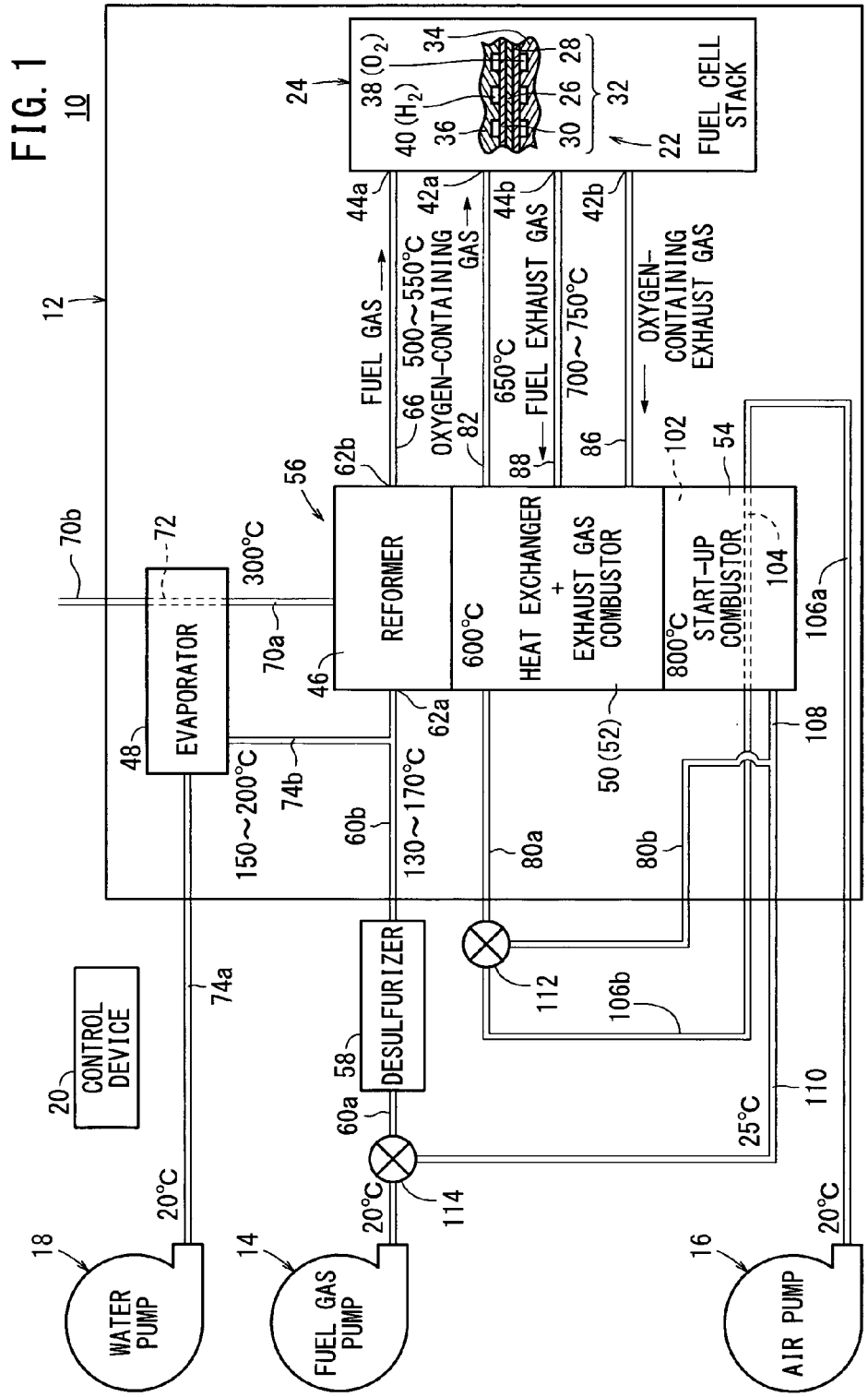
FIG. 1 is a diagram schematically showing a structure of a fuel cell system according to an embodiment of the present invention.

A fuel cell system 10 according to an embodiment of the present invention shown in FIG. 1 is used in various applications, including stationary and mobile applications. For example, the fuel cell system 10 is mounted on a vehicle.

The fuel cell system 10 includes a fuel cell module (SOFC module) 12 for generating electrical energy in power generation by electrochemical reactions of a fuel gas (a gas produced by mixing a hydrogen gas, methane, and carbon monoxide) and an oxygen-containing gas (air), a raw fuel supply apparatus (including a fuel gas pump) 14 for supplying a raw fuel (e.g., city gas) to the fuel cell module 12, an oxygen-containing gas supply apparatus (including an air pump) 16 for supplying the oxygen-containing gas to the fuel cell module 12, a water supply apparatus (including a water pump) 18 for supplying water to the fuel cell module 12, and a control device 20 for controlling the amount of electrical energy generated in the fuel cell module 12.

The fuel cell module 12 includes a fuel cell stack 24 formed by stacking a plurality of solid oxide fuel cells 22 in a vertical direction (or in a horizontal direction). For example, the fuel cell 22 includes an electrolyte electrode assembly 32 (MEA). The electrolyte electrode assembly 32 includes a cathode 28, an anode 30, and an electrolyte 26 interposed between the cathode 28 and the anode 30. For example, the electrolyte 26 is made of ion-conductive solid oxide such as stabilized zirconia.

A cathode side separator 34 and an anode side separator 36 are provided on both sides of the electrolyte electrode assembly 32. An oxygen-containing gas flow field 38 for supplying an oxygen-containing gas to the cathode 28 is formed in the cathode side separator 34, and a fuel gas flow field 40 for supplying a fuel gas to the anode 30 is formed in the anode side separator 36. As the fuel cell 22, various types of conventional SOFC can be adopted.

An oxygen-containing gas supply passage 42a, an oxygen-containing gas discharge passage 42b, a fuel gas supply passage 44a, and a fuel gas discharge passage 44b extend through the fuel cell stack 24. The oxygen-containing gas supply passage 42a is connected to an inlet of each oxygen-containing gas flow field 38, the oxygen-containing gas discharge passage 42b is connected to an outlet of each oxygen-containing gas flow field 38, the fuel gas supply passage 44a is connected to an inlet of each fuel gas flow field 40, and the fuel gas discharge passage 44b is connected to an outlet of each fuel gas flow field 40.

The fuel cell module 12 includes a reformer 46 for reforming a mixed gas of a raw fuel (e.g., city gas) chiefly containing hydrocarbon and water vapor thereby to produce a fuel gas to be supplied to the fuel cell stack 24, and an evaporator 48 for evaporating water and supplying water vapor to the reformer 46, a heat exchanger 50 for raising the temperature of the oxygen-containing gas by heat exchange with a combustion gas and supplying the oxygen-containing gas to the fuel cell stack 24, an exhaust gas combustor 52 for combusting the fuel gas discharged from the fuel cell stack 24 as a fuel exhaust gas and the oxygen-containing gas discharged from the fuel cell stack 24 as the oxygen-containing exhaust gas thereby to produce the combustion gas, and a start-up combustor 54 for combusting the raw fuel and the oxygen-containing gas thereby to produce the combustion gas.

Basically, the fuel cell module 12 includes the fuel cell stack 24 and FC (fuel cell) peripheral equipment 56. The FC peripheral equipment 56 includes the reformer 46, the evaporator 48, the heat exchanger 50, the exhaust gas combustor 52, and the start-up combustor 54. Further, as described later, no exhaust gas pipes are provided for connecting the reformer 46, the heat exchanger 50, the exhaust gas combustor 52, and the start-up combustor 54.

In the FC peripheral equipment 56, the exhaust gas combustor 52 is provided integrally in the heat exchanger 50. The start-up combustor 54 is provided adjacent to one end of the heat exchanger 50. The reformer 46 is provided adjacent to the other end of the heat exchanger 50.

Figure 2:
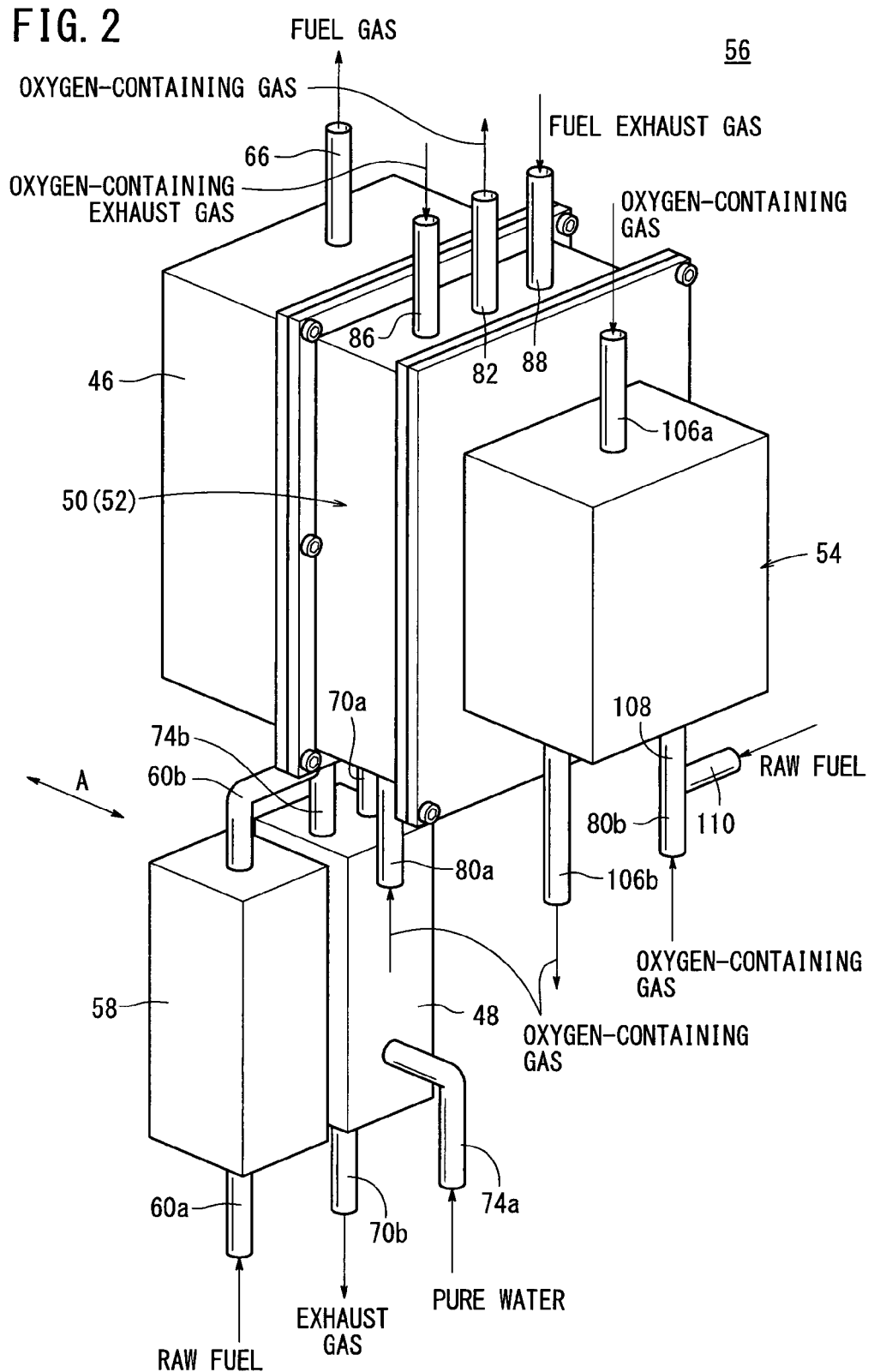
FIG. 2 is a perspective view schematically showing FC (fuel cell) peripheral equipment of the fuel cell system.
Figure 3:
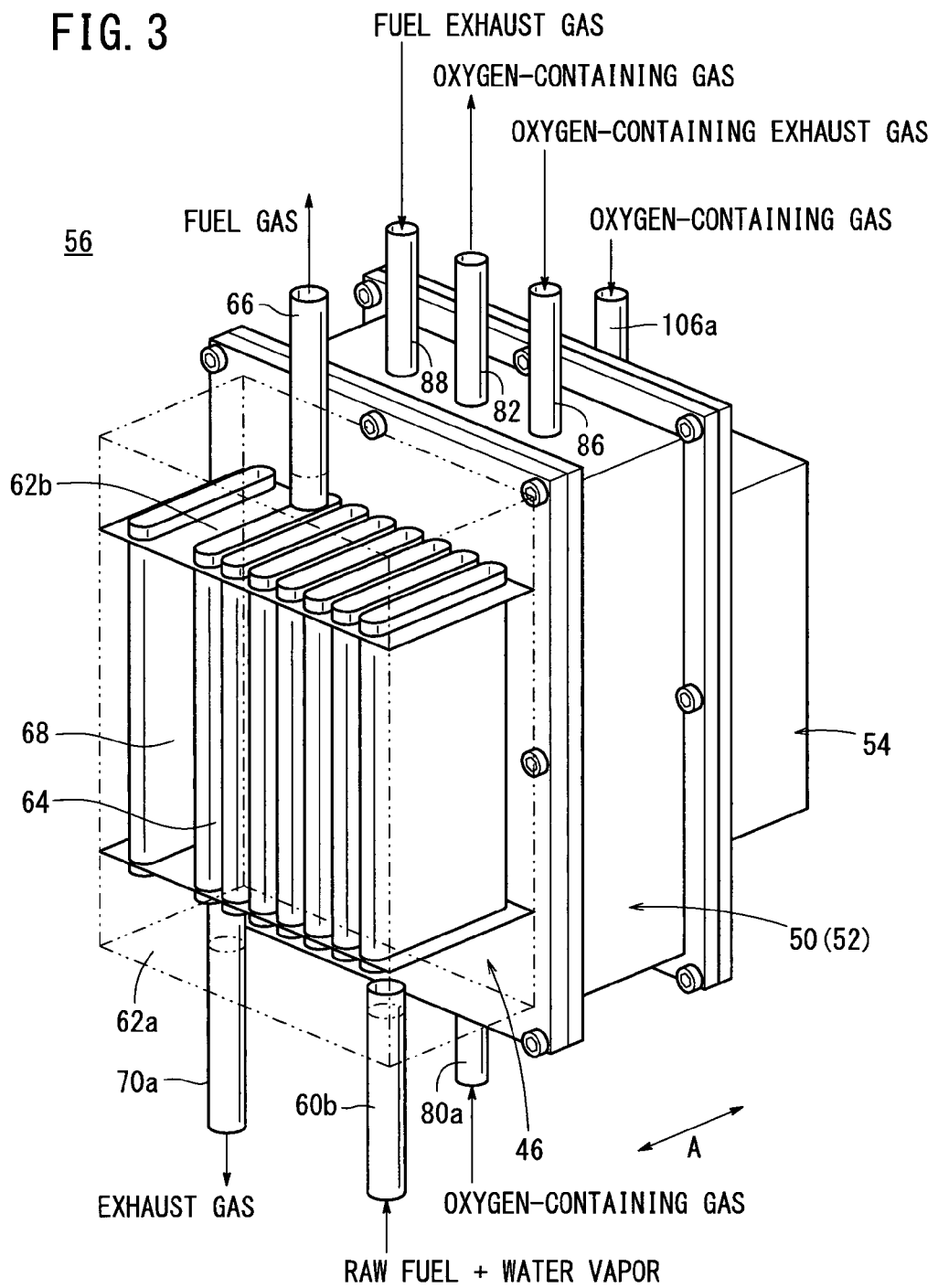
FIG. 3 is a perspective view showing main components of the FC peripheral equipment of the fuel cell system.
Figure 4:
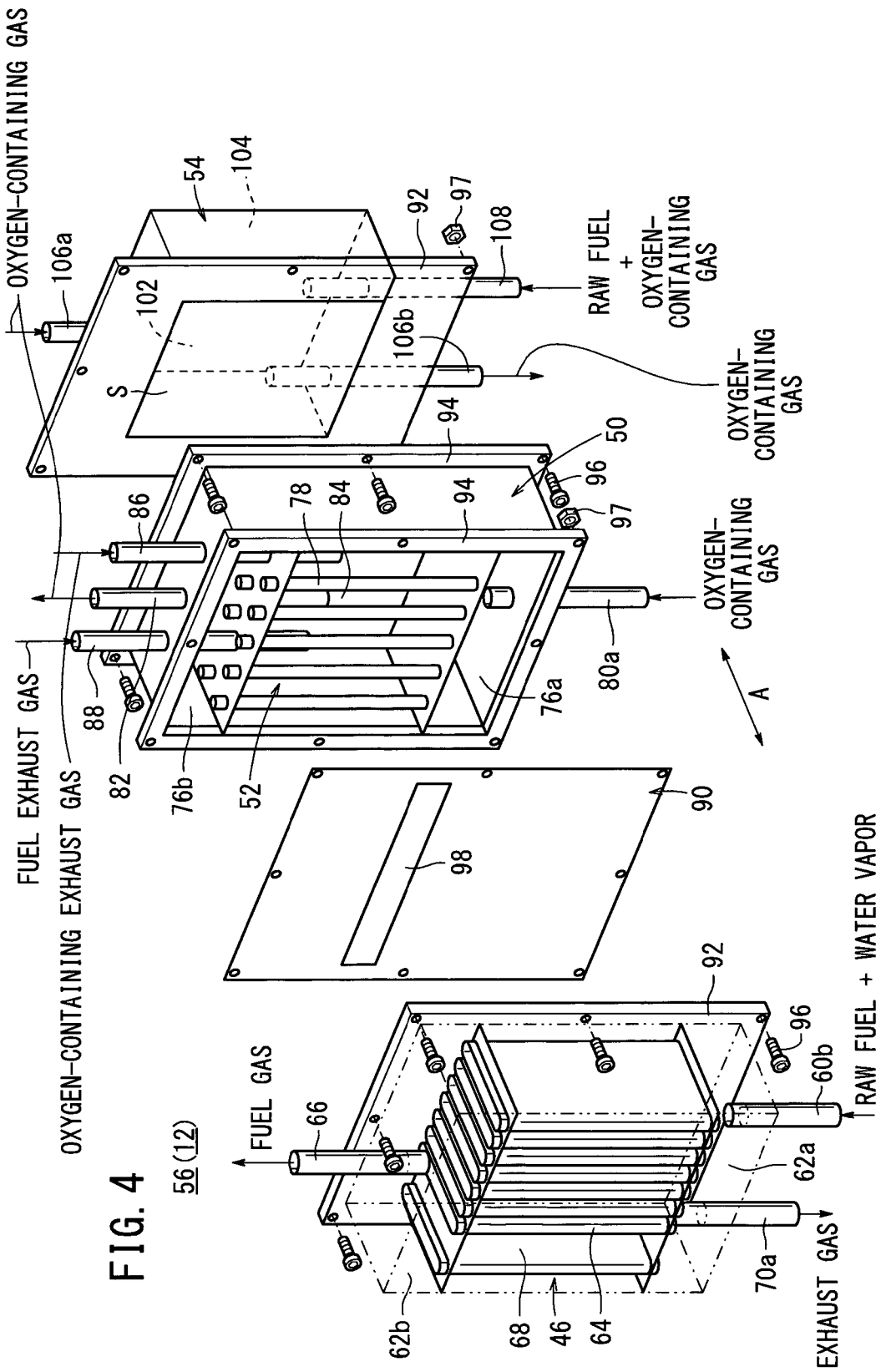
FIG. 4 is an exploded perspective view showing main components of the FC peripheral equipment.

As shown in FIGS. 2 to 4, the heat exchanger 50 is provided upright, and as described later, the oxygen-containing gas flows vertically upwardly. The reformer 46 is provided upright, and the reformed gas flows vertically upwardly. The start-up combustor 54 is directly attached to one side (one end) of the heat exchanger 50, and the reformer 46 is directly attached to the other side (the other end) of the heat exchanger 50. The reformer 46, the heat exchanger 50 (including the exhaust gas combustor 52), and the start-up combustor 54 are stacked in a horizontal direction indicated by an arrow A.

As shown in FIG. 2, the evaporator 48 and a desulfurizer 58 for removing sulfur compounds contained in the city gas (raw fuel) are provided below the heat exchanger 50 and the reformer 46.

The reformer 46 is a preliminary reformer for steam-reforming higher hydrocarbon ($C_{2+}$) such as ethane ($C_2H_6$), propane ($C_3H_8$), and butane ($C_4H_{10}$) in the city gas (raw fuel) thereby to produce the fuel gas chiefly containing methane ($CH_4$), hydrogen, and CO. The operating temperature of the reformer 46 is several hundred ° C.

The fuel cell 22 operates at high temperature, such as several hundred ° C. Methane in the fuel gas is reformed at the anode 30 to obtain hydrogen and CO, and the hydrogen and CO are supplied to a portion of the electrolyte 26 that is positioned adjacent to the anode 30.

As shown in FIG. 1, a raw fuel channel 60a of the raw fuel supply apparatus 14 is connected to the inlet of the desulfurizer 58, and a raw fuel supply channel 60b is connected to the outlet of the desulfurizer 58. This raw fuel supply channel 60b is connected to a reform gas supply chamber 62a of the reformer 46.

Figure 5:
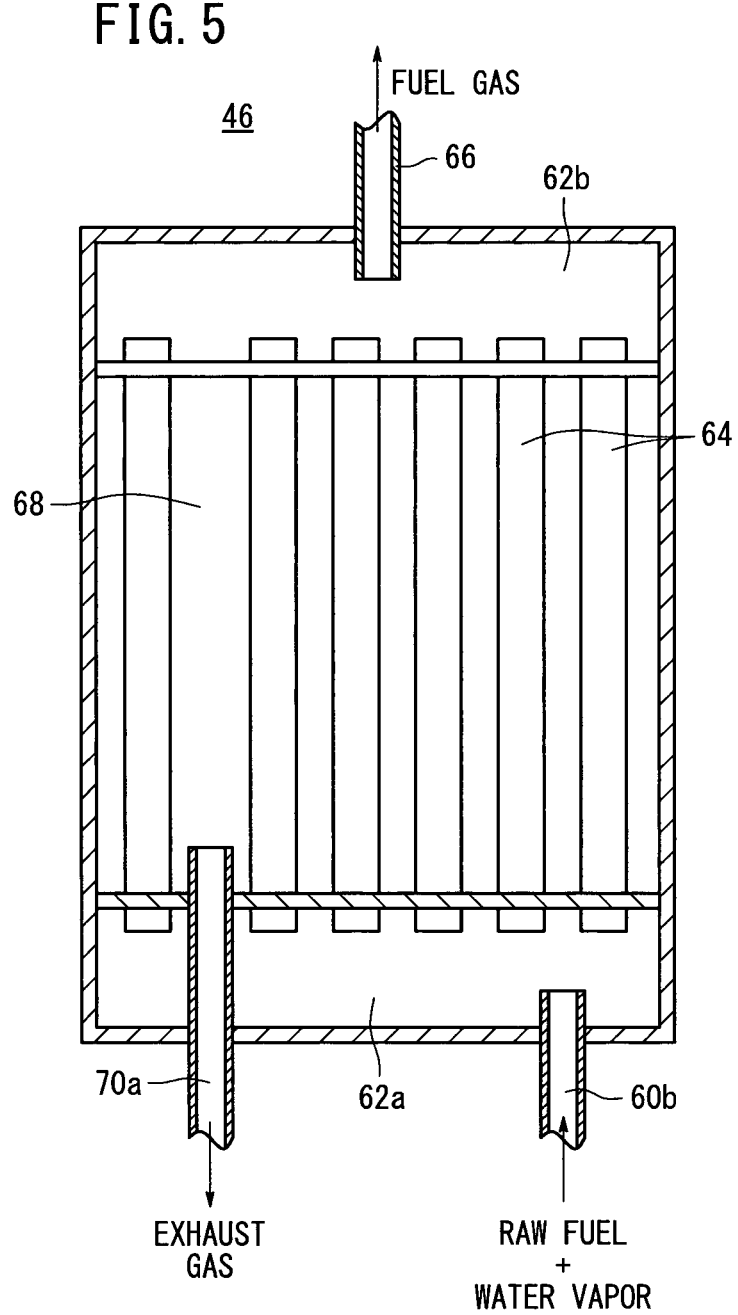
FIG. 5 is a partial cross sectional front view showing a reformer of the FC peripheral equipment.

As shown in FIGS. 3 and 5, the reform gas supply chamber 62a is connected to lower ends of a plurality of reforming pipes 64, and a reform gas discharge chamber 62b is connected to upper ends of the reforming pipes 64. The reform gas discharge chamber 62b is connected to one end of a fuel gas channel 66, and the other end of the fuel gas channel 66 is connected to the fuel gas supply passage 44a of the fuel cell stack 24 (see FIG. 1). Each of the reforming pipes 64 is filled with catalyst (not shown) in the form of pellets for inducing reforming reaction.

A heating space 68 is formed between the reforming pipes 64. An end of an exhaust gas pipe 70a is opened to the heating space 68, and as shown in FIG. 1, the other end of the exhaust gas pipe 70a is connected to an inlet of a heating channel 72 of the evaporator 48. An exhaust pipe 70b is connected to an outlet of the heating channel 72 of the evaporator 48.

A water channel 74a of the water supply apparatus 18 is connected to an inlet of the evaporator 48, and water flowing through the water channel 74a is heated by the exhaust gas flowing along the heating channel 72. As a result, water vapor is produced. One end of a water vapor channel 74b is connected to an outlet of the evaporator 48, and the other end of the water vapor channel 74b is merged to the raw fuel supply channel 60b downstream of the desulfurizer 58.

Figure 6:
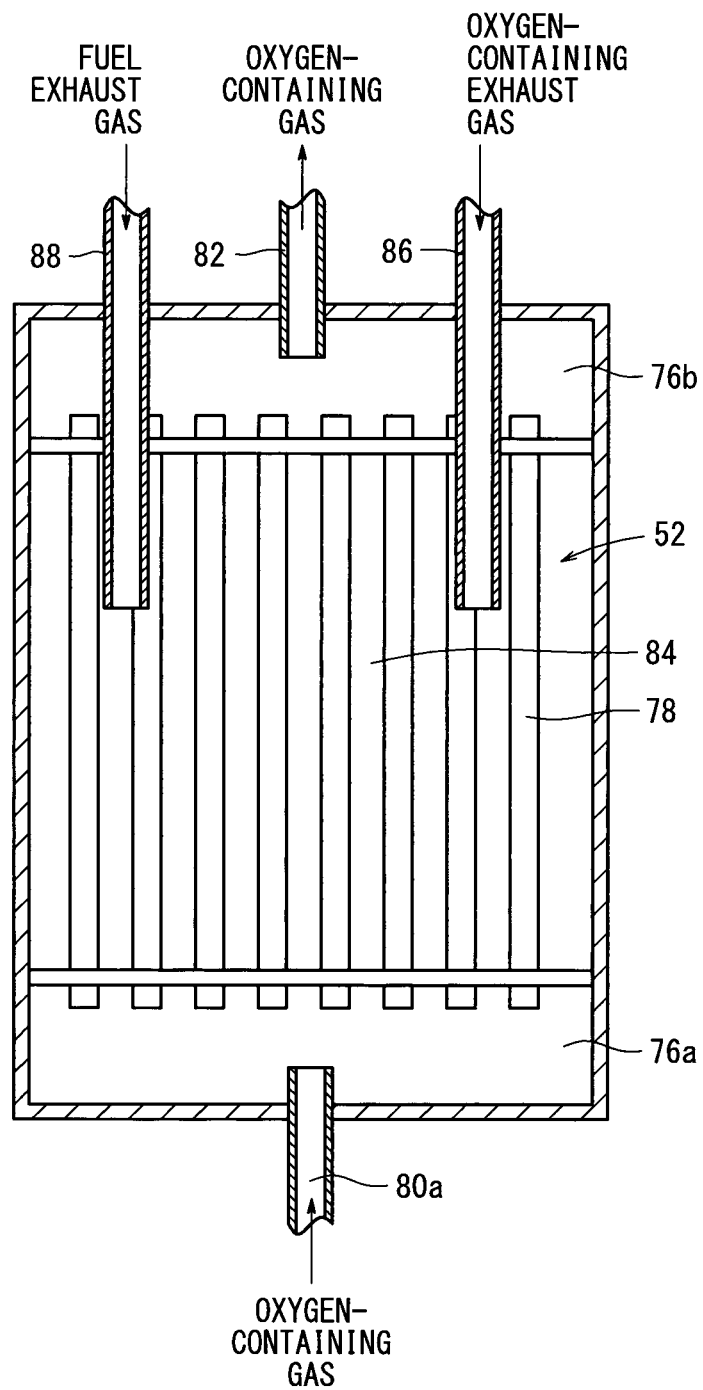
FIG. 6 is a partial cross sectional front view showing a heat exchanger and an exhaust gas combustor of the FC peripheral equipment.

As shown in FIGS. 4 and 6, an oxygen-containing gas supply chamber 76a is provided on the lower side of the heat exchanger 50, and an oxygen-containing gas discharge chamber 76b is provided on the upper side of the heat exchanger 50. Both ends of a plurality of oxygen-containing gas pipes 78 are connected to the oxygen-containing gas supply chamber 76a and the oxygen-containing gas discharge chamber 76b.

One end of a first oxygen-containing gas supply channel 80a is provided in the oxygen-containing gas supply chamber 76a. One end of an oxygen-containing gas channel 82 is provided in the oxygen-containing gas discharge chamber 76b, and the other end of the oxygen-containing gas channel 82 is connected to the oxygen-containing gas supply passage 42a of the fuel cell stack 24 (see FIG. 1).

A plurality of the oxygen-containing gas pipes 78 are placed in a space inside the heat exchanger 50. Further, a combustion chamber 84 of the exhaust gas combustor 52 is formed inside the heat exchanger 50. The combustion chamber 84 functions as a heat source for raising the temperature of the oxygen-containing gas by combustion reaction of the fuel gas (more specifically, fuel exhaust gas) and the oxygen-containing gas (more specifically, oxygen-containing exhaust gas).

An oxygen-containing exhaust gas channel 86 and a fuel exhaust gas channel 88 extend from the oxygen-containing gas discharge chamber 76b side and through the oxygen-containing gas discharge chamber 76b, and one end of the oxygen-containing exhaust gas channel 86 and one end of the fuel exhaust gas channel 88 are provided in the combustion chamber 84. As shown in FIG. 1, the other end of the oxygen-containing exhaust gas channel 86 is connected to the oxygen-containing gas discharge passage 42b of the fuel cell stack 24, and the other end of the fuel exhaust gas channel 88 is connected to the fuel gas discharge passage 44b of the fuel cell stack 24.

As shown in FIG. 4, a wall plate (wall) 90 is provided between the reformer 46 and the heat exchanger 50. The wall plate 90 is sandwiched between a flange 92 of the reformer 46 and a flange 94 of the heat exchanger 50. These components are fixed together using a plurality of bolts 96 and nuts 97. An opening 98 is formed in the wall plate 90 for supplying a combustion gas produced in the combustion chamber 84 of the heat exchanger 50 to the heating space 68 of the reformer 46.

Figure 7:
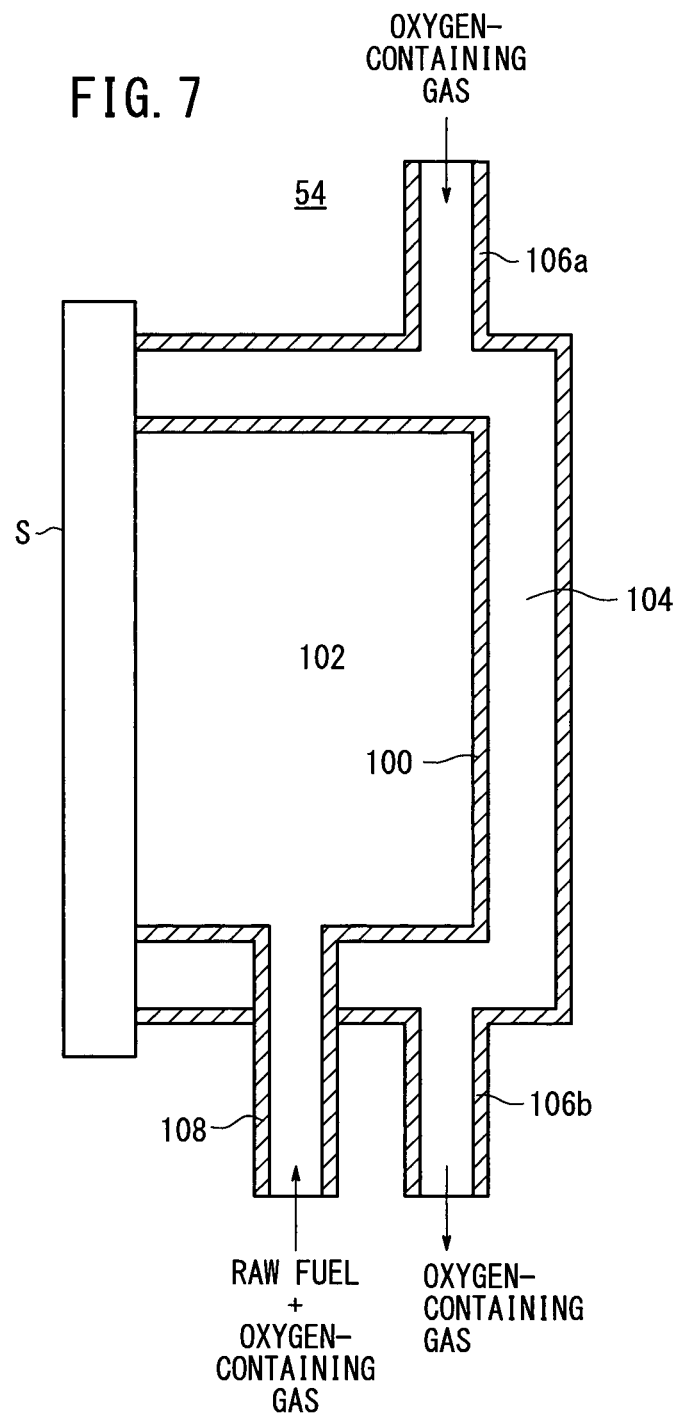
FIG. 7 is a partial cross sectional side view showing a start-up combustor of the FC peripheral equipment.

As shown in FIG. 7, a combustion chamber 102 is formed in the start-up combustor 54 through an internal casing 100, and a coolant channel 104 for cooling the combustion chamber 102 is provided outside the internal casing 100. A first oxygen-containing gas channel 106a of the oxygen-containing gas supply apparatus 16 is connected to an upper portion of the coolant channel 104, and a second oxygen-containing gas channel 106b is connected to a lower portion of the coolant channel 104 (see FIG. 1).

In the combustion chamber 102, a rectangular flaming area S is formed in correspondence with the combustion chamber 84 of the exhaust gas combustor 52 (see FIG. 4). A pre-mixing fuel channel 108 is connected to this combustion chamber 102. As shown in FIG. 1, a second oxygen-containing gas supply channel 80b and a raw fuel branch channel 110 are connected to the pre-mixing fuel channel 108. As shown in FIG. 4, the flanges 92, 94 of the start-up combustor 54 and the heat exchanger 50 are fixed together using a plurality of bolts 96 and nuts 97.

As shown in FIG. 1, the oxygen-containing gas supply apparatus 16 has an oxygen-containing gas regulator valve (oxygen-containing gas distribution mechanism) 112 for distributing the oxygen-containing gas from the second oxygen-containing gas channel 106b to the heat exchanger 50 and the start-up combustor 54, i.e., to the first oxygen-containing gas supply channel 80a and the second oxygen-containing gas supply channel 80b.

The raw fuel supply apparatus 14 has a raw fuel regulator valve (raw fuel distribution mechanism) 114 for distributing the raw fuel to the reformer 46 and the start-up combustor 54, i.e., to the raw fuel supply channel 60b and the raw fuel branch channel 110.

Figure 8:
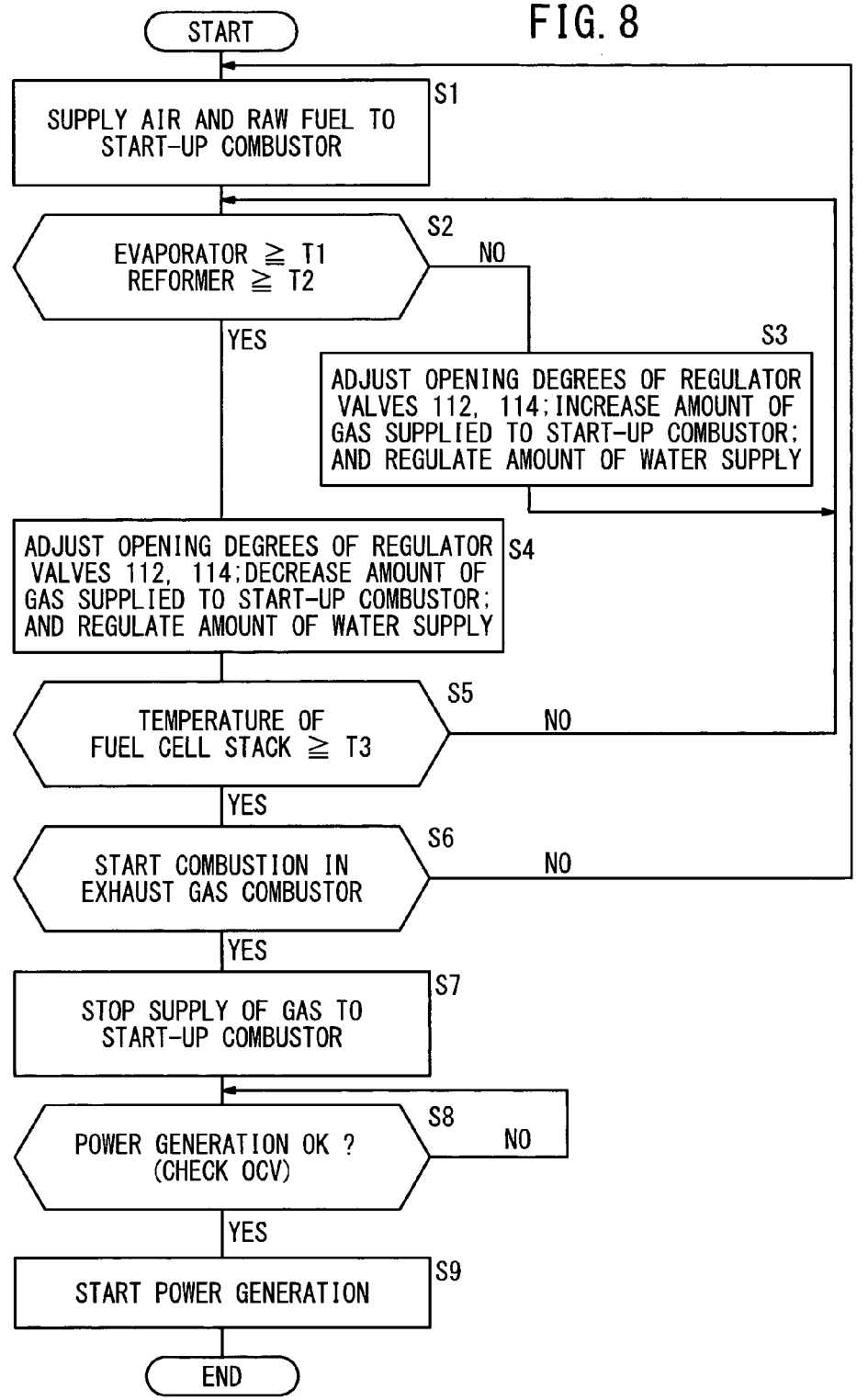
FIG. 8 is a flow chart illustrating an operational sequence from start-up operation to steady operation of the fuel cell system.
Figure 9:
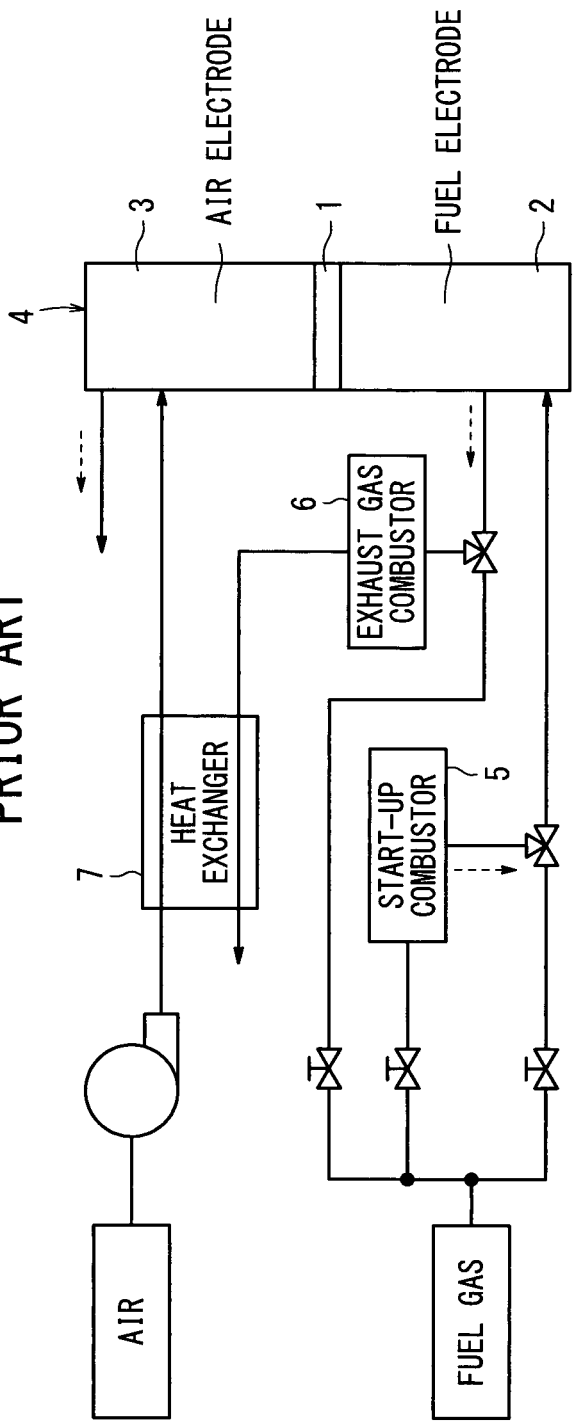
FIG. 9 is a view schematically showing a fuel cell system disclosed in Conventional Technique 1.

Next, operation of the fuel cell system 10 will be described below with reference to a flow chart of FIG. 8.

At the time of starting operation of the fuel cell system 10, the air (oxygen-containing gas) and the raw fuel are supplied to the start-up combustor 54 (step S1). Specifically, in the oxygen-containing gas supply apparatus 16, the air is supplied to the first oxygen-containing gas channel 106a by operation of the air pump. After the air flows through the coolant channel 104 of the start-up combustor 54 into the second oxygen-containing gas channel 106b, the air is supplied from the second oxygen-containing gas supply channel 80b to the pre-mixing fuel channel 108 by operation of adjusting the opening degree of the oxygen-containing gas regulator valve 112.

In the raw fuel supply apparatus 14, raw fuel such as the city gas (containing $CH_4$, $C_2H_6$, $C_3H_8$, $C_4H_{10}$) is supplied to the upstream side of the raw fuel channel 60a by operation of the fuel gas pump. The raw fuel flows into the raw fuel branch channel 110 by operation of adjusting the opening degree of the raw fuel regulator valve 114. This raw fuel is supplied to the pre-mixing fuel channel 108, and mixed with the air. Further, the raw fuel is supplied to the combustion chamber 102 in the start-up combustor 54.

Therefore, the mixed gas of the raw fuel and the air is supplied into the combustion chamber 102, and the mixed gas is ignited to start combustion. Thus, as shown in FIG. 4, since the heat exchanger 50 is directly connected to the start-up combustor 54, the combustion gas is supplied to the combustion chamber 84 of the exhaust gas combustor 52 through the flaming area S of the start-up combustor 54.

The combustion gas supplied to the combustion chamber 84 heats the heat exchanger 50, and the combustion gas moves to the heating space 68 of the reformer 46 through the opening 98 formed in the wall plate 90. Thus, the reformer 46 is heated. The exhaust gas pipe 70a is provided in the heating space 68, and the exhaust gas pipe 70a is connected to the heating channel 72 of the evaporator 48. In the structure, after the combustion gas heats the evaporator 48, the combustion gas is discharged from the exhaust pipe 70b.

Then, the control proceeds to step S2 to determine whether or not the temperature of the evaporator 48 is a predetermined temperature T1 or more and the temperature of the reformer 46 is a predetermined temperature T2 or more. For example, the predetermined temperature T1 is 150° C., and for example, the predetermined temperature T2 is 550° C. If the temperature of the evaporator 48 is less than the predetermined temperature T1 or the temperature of the reformer 46 is less than the predetermined temperature T2, the control proceeds to step S3 (NO in step S2).

In step S3, the opening degree of the oxygen-containing gas regulator valve 112 is adjusted, whereby the amount of the air supplied to the second oxygen-containing gas supply channel 80b is increased. Further, the opening degree of the raw fuel regulator valve 114 is adjusted, whereby the amount of the raw fuel supplied to the raw fuel branch channel 110 is increased. Thus, the combustion rate is increased in the start-up combustor 54, and the amount of the generated heat energy is increased. Incidentally, in the water supply apparatus 18, the amount of water supplied to the evaporator 48 is regulated.

If it is determined that the temperature of the evaporator 48 is the predetermined temperature T1 or more and the temperature of the reformer 46 is the predetermined temperature T2 or more (YES in step S2), then the control proceeds to step S4. In step S4, the opening degree of the oxygen-containing gas regulator valve 112 is adjusted thereby to reduce the amount of the air supplied to the second oxygen-containing gas supply channel 80b. Further, the opening degree of the raw fuel regulator valve 114 is adjusted thereby to reduce the amount of the raw fuel supplied to the raw fuel branch channel 110. Thus, the combustion rate in the start-up combustor 54 becomes lower, and the amount of the generated heat energy is decreased. In the water supply apparatus 18, the amount of water supplied to the evaporator 48 is regulated.

Thus, in the oxygen-containing gas supply apparatus 16, the flow rate of the air supplied to the first oxygen-containing gas supply channel 80a is increased by the oxygen-containing gas regulator valve 112, and the air flows into the oxygen-containing gas supply chamber 76a of the heat exchanger 50.

As shown in FIG. 6, after the air flows into the oxygen-containing gas supply chamber 76a, the air is heated by the combustion gas supplied into the combustion chamber 84 (heat exchange between the air and the combustion gas occurs) while the air is moving from the lower ends to the upper ends of the oxygen-containing gas pipes 78. The heated air is firstly supplied to the oxygen-containing gas discharge chamber 76b, and then, the air is supplied through the oxygen-containing gas channel 82 to the oxygen-containing gas supply passage 42a of the fuel cell stack 24 (see FIG. 1).

In the fuel cell stack 24, after the heated air flows through the oxygen-containing gas flow field 38, the air is discharged from the oxygen-containing gas discharge passage 42b into the oxygen-containing exhaust gas channel 86. As shown in FIG. 6, since the oxygen-containing exhaust gas channel 86 is opened to the combustion chamber 84 of the exhaust gas combustor 52, the air is supplied into the combustion chamber 84.

Further, in the raw fuel supply apparatus 14, as shown in FIG. 1, the flow rate of the raw fuel supplied from the raw fuel channel 60a to the desulfurizer 58 is increased by the raw fuel regulator valve 114. After the raw fuel is desulfurized by the desulfurizer 58, the raw fuel flows through the raw fuel supply channel 60b, and then is supplied to the reform gas supply chamber 62a of the reformer 46. After the water supplied from the water supply apparatus 18 is evaporated by the evaporator 48, the water flows through the raw fuel supply channel 60b, and then is supplied to the reform gas supply chamber 62a.

As shown in FIG. 5, the mixed gas of the raw fuel and the water vapor supplied to the reform gas supply chamber 62a moves through the reforming pipes 64 from the upper ends to the upper ends thereof. In the meanwhile, the mixed gas is heated by the combustion gas supplied into the heating space 68, and is subjected to steam reforming by the catalyst in the form of pellets. In the reforming, hydrocarbon of $C_{2+}$ is removed to produce a reformed gas chiefly containing methane. The reformed gas is firstly supplied to the reform gas discharge chamber 62b as a heated fuel gas, and then the reformed gas is supplied to the fuel gas supply passage 44a of the fuel cell stack 24 through the fuel gas channel 66 (see FIG. 1).

In the fuel cell stack 24, after the heated fuel gas flows through the fuel gas flow field 40, the fuel gas is discharged from the fuel gas discharge passage 44b to the fuel exhaust gas channel 88. As shown in FIG. 6, since the fuel exhaust gas channel 88 is opened to the combustion chamber 84 of the exhaust gas combustor 52, the fuel gas flows into the combustion chamber 84.

As described above, the heated air and the heated fuel gas flow through the fuel cell stack 24 to raise the temperature of the fuel cell stack 24. If it is determined that the temperature of the fuel cell stack 24 is a predetermined temperature T3 (e.g., 650° C.) or more (YES in step S5), the control proceeds to step S6. In step S6, it is determined whether or not combustion is started in the exhaust gas combustor 52.

As shown in FIG. 6, the air is supplied to the combustion chamber 84 of the exhaust gas combustor 52 through the oxygen-containing exhaust gas channel 86, and the fuel gas is supplied to the combustion chamber 84 through the fuel exhaust gas channel 88. Therefore, by heating operation of the start-up combustor 54, when the temperature in the exhaust gas combustor 52 exceeds the self-ignition temperature of the fuel gas, combustion by the air and the fuel gas is started in the combustion chamber 84 (YES in step S6).

If combustion in the exhaust gas combustor 52 is started, then the control proceeds to step S7 in which the opening degree of the oxygen-containing gas regulator valve 112 and the opening degree of the raw fuel regulator valve 114 are adjusted, so that the supply of the air and the raw fuel to the start-up combustor 54 is stopped.

Then, the control proceeds to step S8 for determining whether or not the fuel cell stack 24 is ready for power generation. More specifically, OCV (open-circuit voltage) of the fuel cell 22 is measured, and if the OCV reaches a predetermined value, then it is determined that the fuel cell stack 24 is ready for power generation (YES in step S8). Thus, power generation is started in the fuel cell stack 24 (step S9).

During power generation of the fuel cell stack 24, in the same manner as in the case of the start-up operation, the air flows through the oxygen-containing gas flow field 38, and the fuel gas flows through the fuel gas flow field 40. Therefore, the air is supplied to the cathode 28 of each fuel cell 22, and the fuel gas is supplied to the anode 30 of each fuel cell 22 to induce chemical reactions at the cathode 28 and the anode 30 for generating electricity.

The air consumed in the reaction (containing unconsumed air) is discharged as oxygen-containing exhaust gas to the oxygen-containing exhaust gas channel 86. Further, the fuel gas consumed in the reaction (containing unconsumed fuel gas) is discharged as the fuel exhaust gas to the fuel exhaust gas channel 88. The oxygen-containing exhaust gas and the fuel exhaust gas are supplied to the exhaust gas combustor 52, and consumed in combustion in the exhaust gas combustor 52.

In the embodiment, the fuel cell module 12 includes the fuel cell stack 24, the reformer 46, the evaporator 48, the heat exchanger 50, the exhaust gas combustor 52, and the start-up combustor 54. The exhaust gas combustor 52 is provided integrally in the heat exchanger 50, and the start-up combustor 54 is provided adjacent to one end of the heat exchanger 50.

Thus, as shown in FIGS. 2 and 3, the heat exchanger 50, the exhaust gas combustor 52, and the start-up combustor 54 are substantially combined together. Accordingly, heat radiation from the fuel cell module 12 is minimized, and losses of the heat energy can be suppressed suitably.

In particular, even in the fuel cell 22 having a large A/F (air/fuel gas), it is possible to raise the temperature of the supplied oxygen-containing gas (air) effectively. Therefore, thermally self-sustaining operation can be performed reliably.

Further, in the FC peripheral equipment 56, the heat exchanger 50, the exhaust gas combustor 52, and the start-up combustor 54 are connected without using any pipes. Therefore, combustion circuits (e.g., pipes) are simplified. Further, the number of components of the fuel cell module 12 is reduced as a whole. Thus, reduction in the size and the cost is achieved.

Further, as shown in FIGS. 4 and 7, the coolant channel 104 is provided for allowing the air (oxygen-containing gas) to flow therethrough to cool the start-up combustor 54, before the air is supplied to the heat exchanger 50.

Therefore, the air is supplied as the coolant for cooling the start-up combustor 54 before the air is supplied to the heat exchanger 50. Thus, the temperature in the combustion chamber 102 of the start-up combustor 54 can be kept below the self-ignition temperature of the fuel gas, and thus backfire is suppressed. Accordingly, premixed combustion of the raw fuel and the oxygen-containing gas is achieved, and improvement in the durability of the start-up combustor 54 is achieved easily.

Further, as shown in FIG. 1, the fuel cell module 12 includes the oxygen-containing gas regulator valve (oxygen-containing gas distribution mechanism) 112 for distributing the air to the heat exchanger 50 and the start-up combustor 54. In the structure, it becomes possible to raise the temperature of the fuel cell stack 24, and the temperature of the FC peripheral equipment 56 including the reformer 46, the evaporator 48, the heat exchanger 50 and the exhaust gas combustor 52 at the same time. Thus, reduction in the time required for starting operation of the fuel cell module 12 can be achieved.

Further, since precise temperature control is performed for the fuel cell stack 24 and the FC peripheral equipment 56, respectively, thermally self-sustaining operation of the fuel cell module 12 is facilitated. Further, when heat is insufficient in the fuel cell stack 24 or the FC peripheral equipment 56, heat can be supplied from the start-up combustor 54 to the fuel cell stack 24 or the FC peripheral equipment 56.

Further, the fuel cell module 12 includes the raw fuel regulator valve (raw fuel distribution mechanism) 114 for distributing the raw fuel to the reformer 46 and the start-up combustor 54. Thus, the fuel cell stack 24 and the FC peripheral equipment 56 can be heated at the same time, and reduction in the time required for starting operation of the fuel cell module 12 is achieved.

Further, since precise temperature control is performed for the fuel cell stack 24 and the FC peripheral equipment 56, respectively, thermally self-sustaining operation of the fuel cell module 12 is facilitated. Further, when heat is insufficient in the fuel cell stack 24 or the FC peripheral equipment 56, heat can be supplied from the start-up combustor 54 to the fuel cell stack 24 or the FC peripheral equipment 56.

Further, as shown in FIGS. 2 and 3, the reformer 46 is provided adjacent to the other end of the heat exchanger 50. In the structure, since the reformer 46, the heat exchanger 50, the exhaust gas combustor 52, and the start-up combustor 54 are substantially combined together, radiation from the fuel cell module 12 can be suppressed as much as possible. Thus, losses of heat energy can be suppressed, and thermally self-sustaining operation is facilitated suitably. Further, combustion circuits (e.g., pipes) are simplified, and the number of components is reduced. Accordingly, reduction in the size and cost can be achieved.

Further, as shown in FIG. 4, the wall plate 90 is provided between the reformer 46 and the heat exchanger 50, and the opening 98 is formed in the wall plate 90 for supplying the combustion gas from the heat exchanger 50 to the heating space 68 of the reformer 46.

In the structure, since the reformer 46, the heat exchanger 50, the exhaust gas combustor 52, and the start-up combustor 54 are substantially combined together, radiation from the fuel cell module 12 can be suppressed as much as possible. Thus, losses of heat energy can be suppressed, and thermally self-sustaining operation is facilitated suitably. Further, since pipes are not required between the reformer 46 and the heat exchanger 50, combustion circuits (e.g., pipes) are simplified, and the number of components is reduced. Accordingly, reduction in the size and cost can be achieved.

Further, the fuel cell module 12 is a solid oxide fuel cell module. Therefore, the fuel cell module 12 is applicable to high temperature type fuel cells such as SOFC.

Although certain preferred embodiments of the present invention have been shown and described in detail, it should be understood that various changes and modifications may be made therein without departing from the scope of the appended claims.

The invention claimed is:

1. A fuel cell module comprising:
a fuel cell stack formed by stacking a plurality of fuel cells for generating electricity by electrochemical reactions of a fuel gas and an oxygen-containing gas;
a reformer for reforming a mixed gas of a raw fuel chiefly containing hydrocarbon and water vapor to produce the fuel gas supplied to the fuel cell stack;
an evaporator for evaporating water, and supplying water vapor to the reformer;
a heat exchanger for raising the temperature of the oxygen-containing gas by heat exchange with a combustion gas, and supplying the oxygen-containing gas to the fuel cell stack;
an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas; and
a start-up combustor for combusting the raw fuel and the oxygen-containing gas to produce the combustion gas,
wherein the exhaust gas combustor is provided integrally in the heat exchanger;
the start-up combustor is provided adjacent to one end of the heat exchanger, and the start-up combustor has a coolant channel configured to allow the oxygen-containing gas to flow therethrough to cool the start-up combustor before the oxygen-containing gas is supplied to the heat exchanger,
the reformer is provided adjacent to another end of the heat exchanger,
a wall is provided between the reformer and the heat exchanger; and
an opening is formed in the wall for supplying the combustion gas from the heat exchanger to the reformer.

2. The fuel cell module according to claim 1, further comprising an oxygen-containing gas distribution mechanism for distributing the oxygen-containing gas to the heat exchanger and the start-up combustor.

3. The fuel cell module according to claim 1, further comprising a raw fuel distribution mechanism for distributing the raw fuel to the reformer and the start-up combustor.

4. The fuel cell module according to claim 1, wherein the fuel cell module is a solid oxide fuel cell module.

* * * * *